US010414250B2

(12) United States Patent
Seeling

(10) Patent No.: US 10,414,250 B2
(45) Date of Patent: Sep. 17, 2019

(54) VEHICLE EXTERIOR WINDSHIELD VISOR ACCESSORY

(71) Applicant: Dwayne A. Seeling, Chillicothe, OH (US)

(72) Inventor: Dwayne A. Seeling, Chillicothe, OH (US)

( * ) Notice: Subject to any disclaimer, the term of this patent is extended or adjusted under 35 U.S.C. 154(b) by 48 days.

(21) Appl. No.: 15/817,250

(22) Filed: Nov. 19, 2017

(65) Prior Publication Data

US 2018/0141413 A1 May 24, 2018

Related U.S. Application Data

(60) Provisional application No. 62/497,424, filed on Nov. 19, 2016.

(51) Int. Cl.
*B60J 3/00* (2006.01)
*B60J 1/20* (2006.01)
*B60J 7/22* (2006.01)

(52) U.S. Cl.
CPC ............. *B60J 3/002* (2013.01); *B60J 1/20* (2013.01); *B60J 7/226* (2013.01)

(58) Field of Classification Search
CPC ............. B60J 3/002; B60J 7/226; B60J 1/20
USPC .............. 296/152, 217, 95.1, 96.11, 97.7
See application file for complete search history.

(56) References Cited

U.S. PATENT DOCUMENTS

| 2,289,173 | A | * | 7/1942 | Best | B60J 7/061 |
| | | | | | 296/107.13 |
| 6,189,962 | B1 | * | 2/2001 | Henderson | B60J 7/11 |
| | | | | | 280/756 |
| 6,530,620 | B1 | * | 3/2003 | Turney | B60J 3/002 |
| | | | | | 160/DIG. 3 |
| 6,578,854 | B2 | * | 6/2003 | Wucherpfennig | A63B 71/0009 |
| | | | | | 180/330 |
| 8,757,662 | B2 | * | 6/2014 | Deschambault | B60J 7/104 |
| | | | | | 280/756 |
| 10,173,507 | B2 | * | 1/2019 | Rodriguez | B60J 7/11 |

* cited by examiner

Primary Examiner — Jason S Morrow
Assistant Examiner — E Turner Hicks
(74) Attorney, Agent, or Firm — Miracle IP; Bryce D. Miracle

(57) ABSTRACT

A vehicle exterior windshield visor accessory is provided which is configured to assist in managing some of the unwanted outdoor elements such as excessive wind and bright sunlight. In a version, the visor accessory is generally configured to be operably and attachably removable with existing and future exposed top or removable top type vehicles having a roll cage. Generally, the visor accessory includes a front shade panel assembly, a first and second lateral end shade panels, and a means for securing each end shade panel to the roll cage.

8 Claims, 7 Drawing Sheets

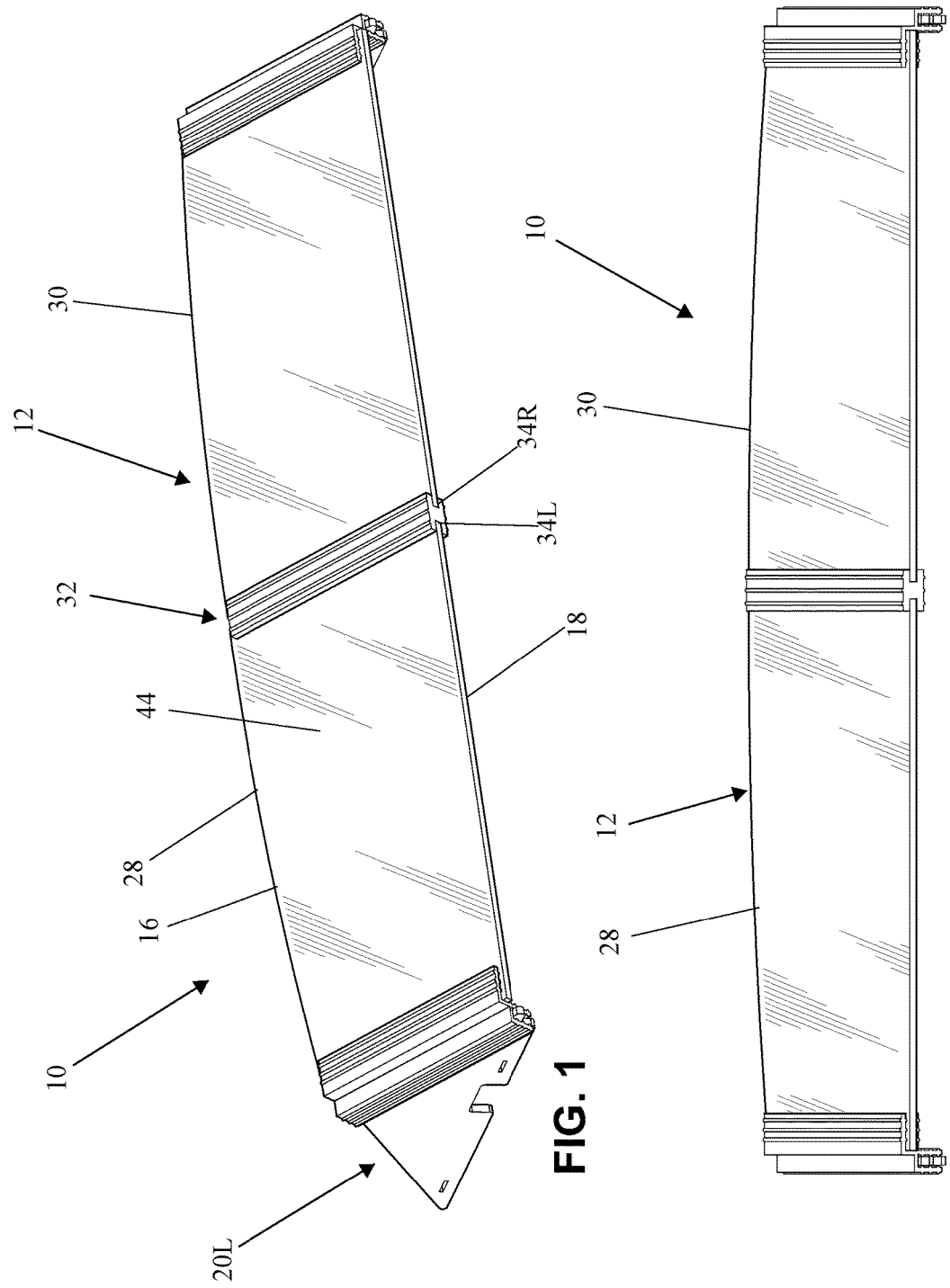

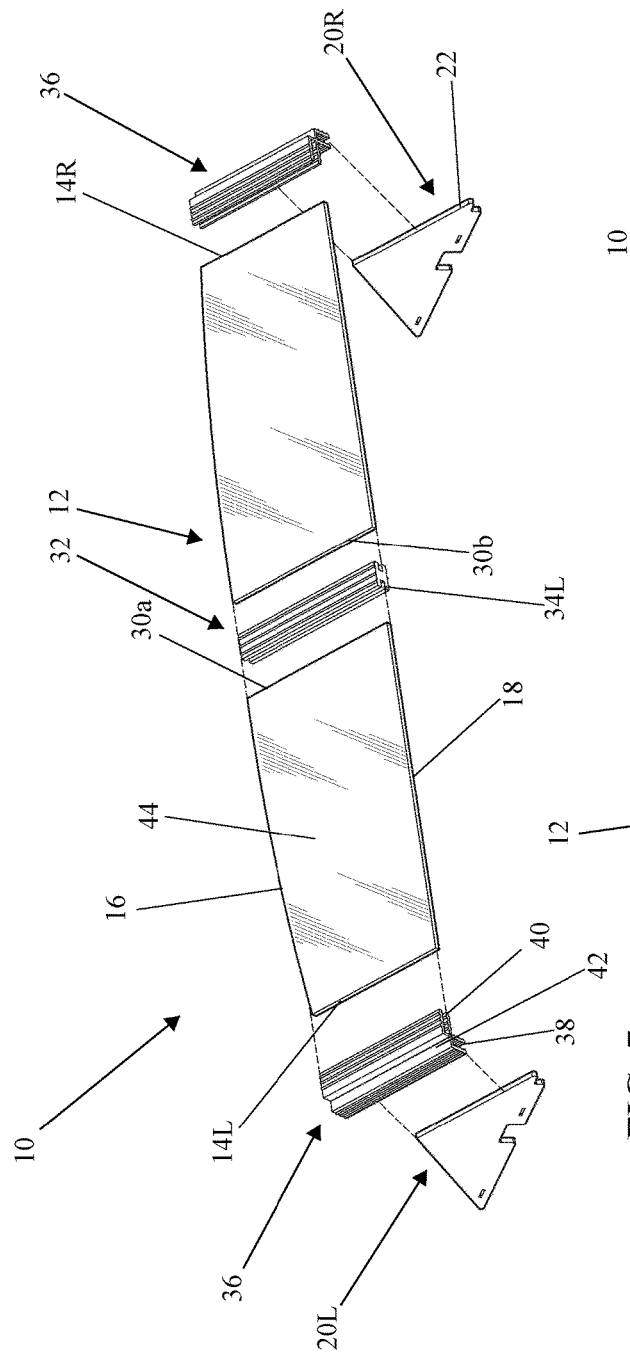
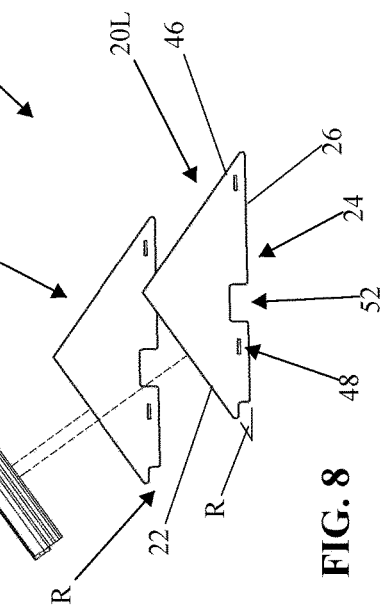

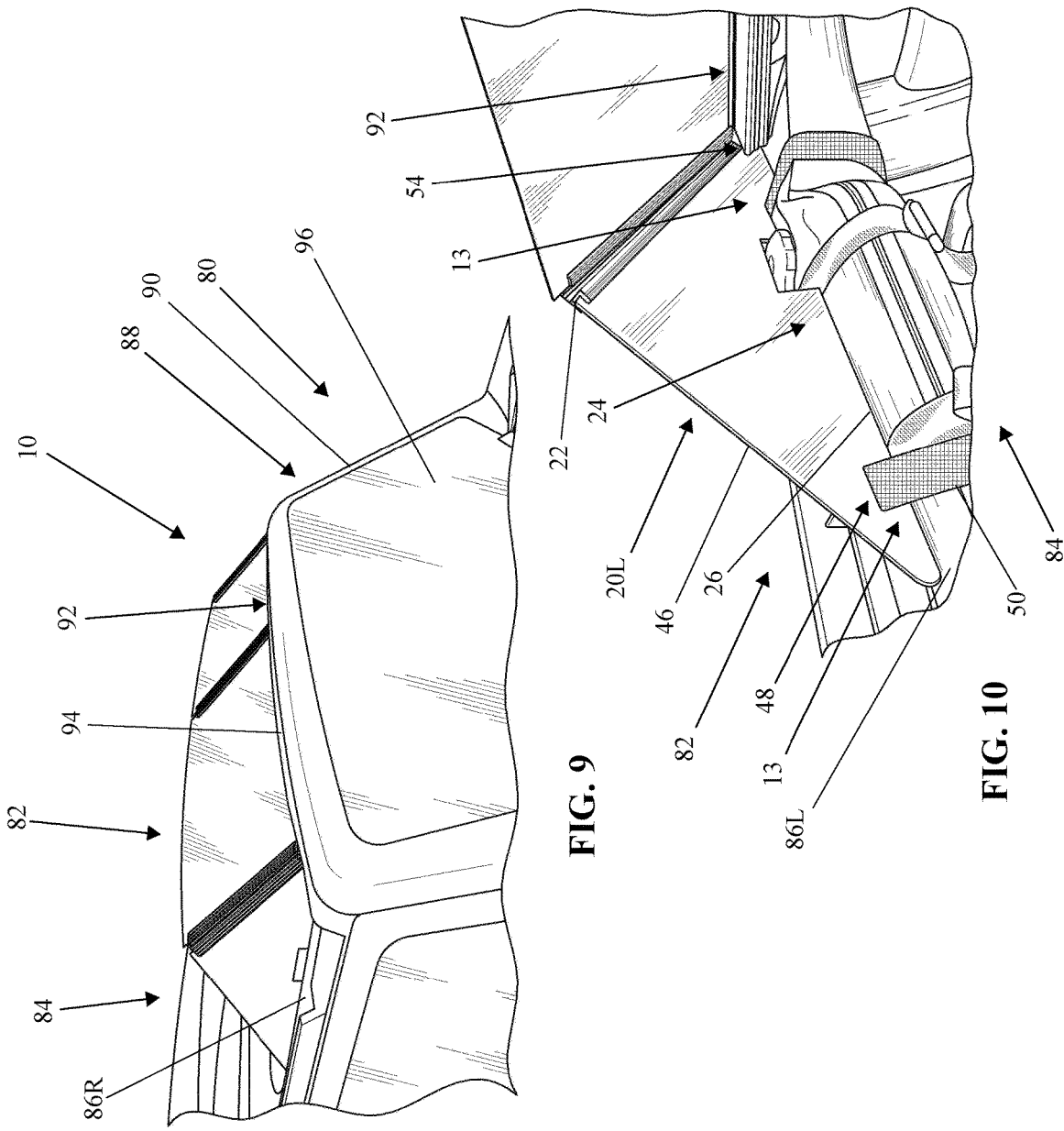

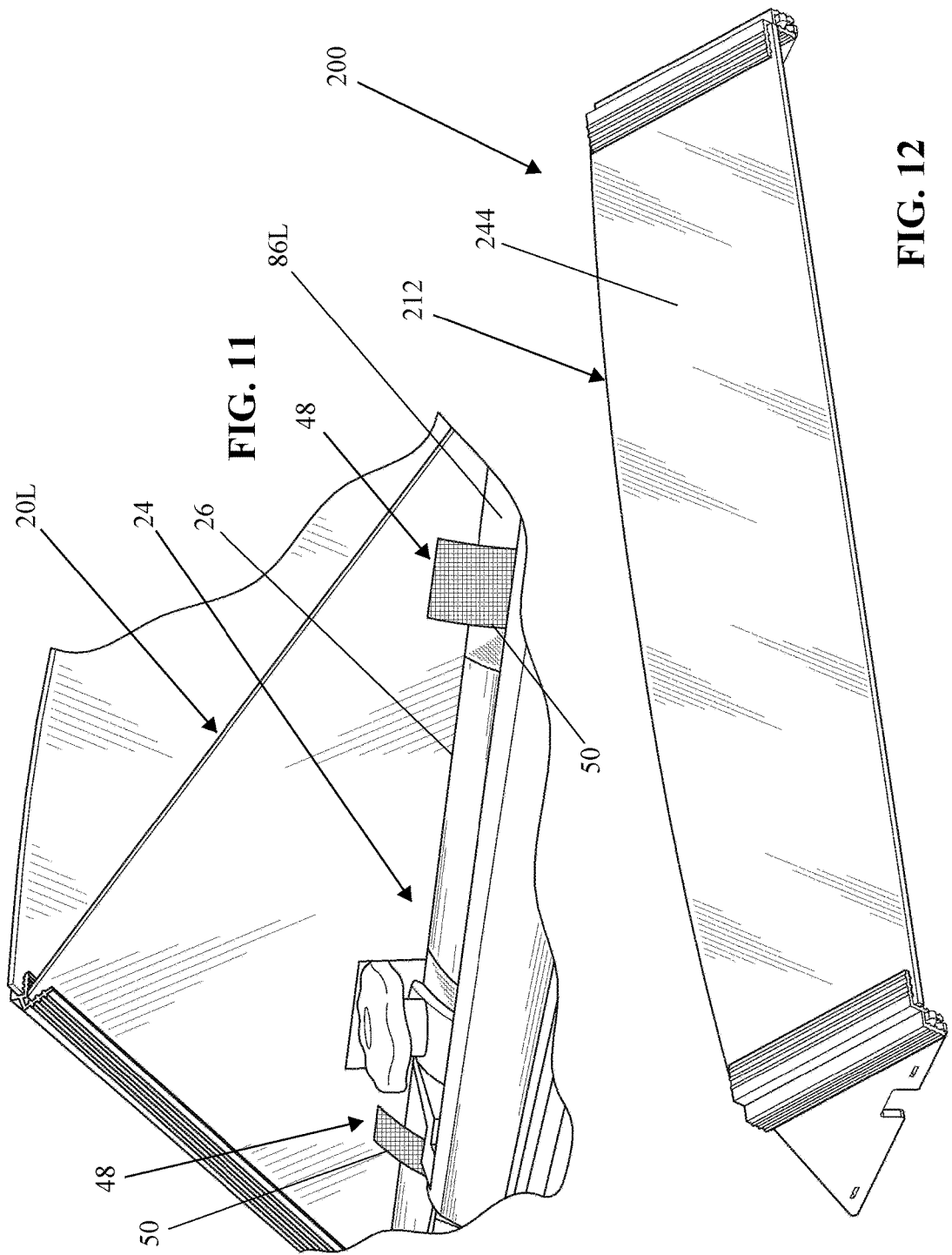

VEHICLE EXTERIOR WINDSHIELD VISOR ACCESSORY

This application is based upon and claims the priority filing date of the previously filed, U.S. Provisional patent application entitled "J-SHADEZ" filed Nov. 19, 2016, Ser. No. 62/497,424, the entire disclosure of which is hereby incorporated herein by reference.

BACKGROUND

The present invention relates to the field of vehicle accessories, particular accessories for vehicles with removable roofs or convertible type vehicles.

There are millions of vehicles on the road today that either boast a convertible style top or provide the option of removing the roof altogether. These styles of vehicles are great for warm, outdoor adventures or even a short jaunt with friends down Main Street U.S.A. Riders enjoy the rush of open air, outdoor smells, and unhindered view of the sky and surrounding terrain.

However, sometimes the outdoor elements can be somewhat harsh, such as the radiant sun throughout the day relentlessly shining down on the driver and passengers. The drivers and passengers find themselves having to remember their hats and sunglasses or find themselves constantly shading their eyes from the sun with their hand—distracting them from operating the vehicle in a safe manner. Moreover, throughout the movement of the vehicle, wind carrying debris, bugs, and pollen can easily circulate over the windshield and into the cab of the vehicle, further emphasizing the harsh affects of the outdoor elements.

For the foregoing reasons, there is a need for an improved design which helps shield unwanted outdoor elements away from the driver and passenger during operation of vehicle outfitted with a removable roof or convertible top.

SUMMARY

In accordance with the invention, a vehicle exterior windshield visor accessory is provided which is configured to assist in managing some of the unwanted outdoor elements such as excessive wind and bright sunlight.

In a version of the application the exterior windshield visor accessory is operable and attachably removable with exposed top vehicles having a roll cage, the visor accessory generally comprises: a) a front shade panel assembly having a first end, second end, an upper perimeter, and a lower perimeter; b) a first and second lateral end shade panels attachable to the respective first and second front shade panel ends and configured to couple with each respective front roll bar; and c) a means for securing each end shade panel to the respective front roll bar.

In a version, a means for operably connecting each end shade panel to the respective first and second end of the front shade panel is provided. For example, the first and second lateral end shade panels further comprise a forward leading edge operably attachable to the respective first and second front shade panel ends; and wherein the means for operably connecting each end shade panel to the respective first and second end of the front shade panel is a hinged connector having a first longitudinal slot hingedly connected to a second longitudinal slot, wherein the first longitudinal slot is configured to operably seat the forward leading edge of the respective end shade panel and the second longitudinal slot is configured to operably seat the respective end of the front panel shade.

In a version of the application, the front panel assembly comprises one or more laterally extending and aligned shade panels and a means for connecting each pairing end of adjacent panels. As an example, the means for connecting each pairing end of adjacent panels is a structure having a first laterally exposed longitudinal slot and a mirrored opposing laterally exposed second longitudinal slot, each longitudinal slot is operably configured to seat the respective pairing end of adjacent panels, thereby providing a seal between the respective pairing ends.

In yet another version of the application, the first and second lateral end shade panels further comprise a forward leading edge operably attachable to the respective first and second front shade panel ends; and a bottom portion having a bottom edge adapted to couple with each respective front roll bar.

In yet another version, the bottom portion of each end shade panel comprises one or more slots for receiving the means for securing each end shade panel to the respective front roll bar.

In some version, the bottom edge of each end shade panel comprises a shaped gap for avoiding impeding structures near the respective front roll bar and vehicle windshield for proper placement of visor accessory.

In certain version of the application, the forward leading edge and the bottom edge form a forward angle, wherein the forward angle comprises a shaped gap for operably sealing with the upper frame assembly.

In an example version of the application, each end shade panel is operably configured to position the front shade panel such that the angle formed between the plane formed by the surface of the front shade panel and the horizontal plane of the front bars of the roll cage is between 30-50 degrees.

These and other features of the present invention will become readily apparent upon further review of the following specification and drawings.

BRIEF DESCRIPTION OF THE DRAWINGS

These and other features, aspects, and advantages of the present invention will become better understood with regard to the following description and accompanying figures where:

FIG. 1 is front perspective view of a version of the application;

FIG. 2 is a front elevation view of the version shown in FIG. 1;

FIG. 7 is a disassembled front perspective view of the version shown in FIG. 1;

FIG. 8 is a disassembled left side view of the version shown in FIG. 1.

FIG. 9 is an illustrative front perspective view showing a version mounted to a vehicle having an exposed top;

FIG. 10 is an illustrative rear perspective view showing a version mounted to the roll cage and windshield assembly of a vehicle;

FIG. 11 is an illustrative view left side view showing a version mounted to the roll cage and windshield assembly of a vehicle;

FIG. 12 is a front perspective view of a version of the application;

DETAILED DESCRIPTION

Figure 3:
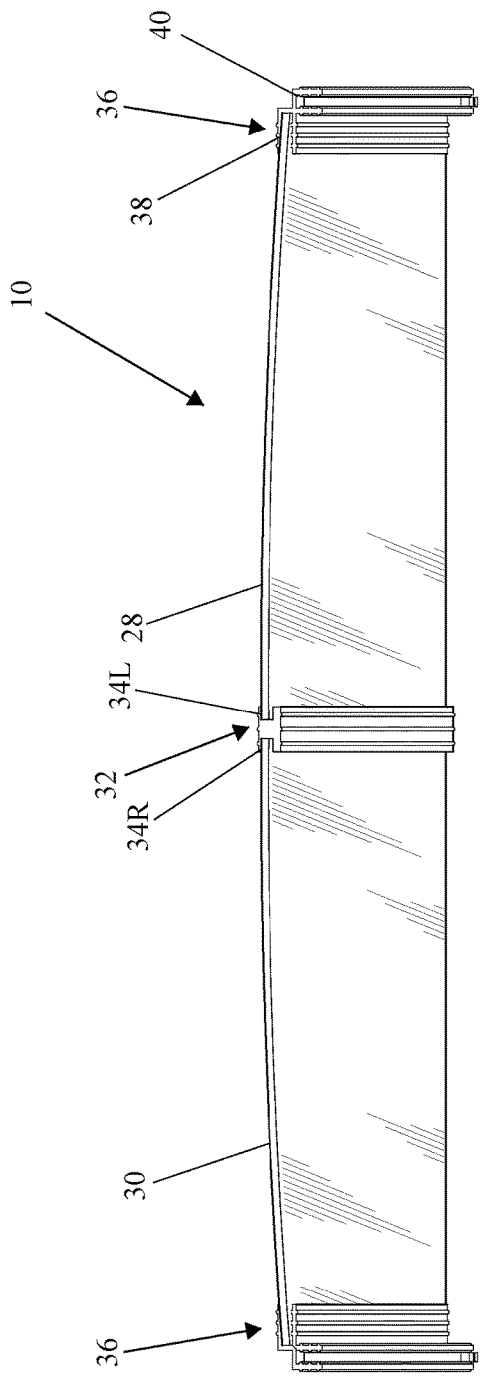
FIG. 3 is a rear elevation view of the version shown in FIG. 1.

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other versions that depart from these specific details. In other instances, detailed descriptions of well-known devices, circuits, and methods are omitted so as not to obscure the description of the present invention with unnecessary detail.

Moreover, the description is not to be taken in the limiting sense, but is made merely for the purpose illustrating the general principles of the invention, since the scope of the invention is best defined by the appended claims. Various inventive features are described below that can each be used independently of one another or in combination with other features.

Unless otherwise defined, all technical terms used herein have the same meaning as commonly understood by one of ordinary skill in the art to which the invention belongs. As used in the specification and the appended claims, the singular forms "a," "an," and "the" include plural references unless the context clearly dictates otherwise. Any reference to "or" herein is intended to encompass "and/or" unless otherwise stated.

With reference to the figures, particularly FIG. 1-FIG. 12, a description of a version of the invention will be provided and is generally designated as numeral 10. Generally speaking, the application is directed towards an attachably removable exterior windshield visor accessory 10 which is configured to be operably attachable to vehicles having exposed tops. In a particular version, the accessory is attachable to vehicles having a removeable top exposing a roll cage and a windshield having an upper frame assembly.

FIG. 9-FIG. 12, illustrate an example type vehicle 80 having an open top 82 exposing a roll cage 84 which boasts a right and left front bars 86L, 86R which extend from the rear of the vehicle 80 towards the upper frame 92 perimeter 94 (FIG. 9) of the factory windshield assembly 88. The factory windshield assembly 88 comprising a frame 90 encompassing the windshield glass 96 extending upward and terminating at the upper frame 92 and upper frame perimeter 94.

The visor accessory 10 is generally configured to couple and seal with existing vehicle windshield assemblies 88 near the upper frame 92—and essentially providing a shield structure which extends above and aft of the vehicle windshield assembly 88 at an angle for providing superior shade from the sun and continue to direct airflow smoothly from the windshield assembly 88 and over the vehicle 80.

In a first version of the application as shown in FIG. 1-FIG. 8, the windshield visor accessory 10 generally comprises: a front shade panel assembly 12 having a first end (left) 14L, second end (right) 14R, an upper perimeter 16, and a lower perimeter 18; a first and second lateral end panels 20L, 20R, each having a forward leading edge 22 operably attachable to the respective first and second front shade panel end 14L, 14R and a bottom portion 24 having an edge 26 adapted to couple with each respective front roll bar 86L, 86R; and a means for securing 13 each end shade panel to the respective front roll bar 86L, 86R.

In the version illustrated in FIG. 1-FIG. 8, the front shade panel assembly 12 comprises one or more laterally extending and aligned shade panels 28, 30 and a means for connecting each pairing end 30a, 30b (FIG. 7). In the example version, there are two mirrored shade panels 28, 30 bisected by the means for connecting the pairing ends 32. Each shade panel 28, 30 upper perimeter 16 curves upwards extending from opposing ends 14L, 14R to the bisecting means for connecting the pairing ends 32.

In the version, the means for connecting the pairing ends 32 is a resilient structure having qualities of sealing the space between each shade panel 28, 30, such as a plastic or rubber. The means for connecting the pairing ends 32, in the example, is a structure 32 having a first laterally exposed longitudinal slot 34L and a mirrored opposing laterally exposed second longitudinal slot 34R, each longitudinal slot 34L, 34R is operably configured to seat the respective pairing end 30a, 30b of adjacent panels, thereby providing a seal between the respective pairing ends 30a, 30b. Other structures which connect and provide a seal between the one or more shade panels can certainly be envisioned and should not be limited to the preceding example.

Preferably, the visor accessory 10 is tinted or otherwise opaque limiting the passage light therethrough in order to adequately shade the driver and passengers of the vehicle 80. However, the visor accessory 10 can certainly be opaque, translucent, semi-transparent, transparent, or a variation therebetween or combination thereof. Ideally, the one or more front shade panel are made of a plastic such as acrylic. However, they can be made of any material which accomplishes the purpose of the application such as glass, etched glass, metal, or a composite material.

As best illustrated by FIG. 7 and FIG. 8, the version further comprises a means for connecting 36 each end shade panel 20L, 20R to the respective first and second end 14L, 14R of the front shade panel assembly 12. In the illustrated example, the means for connecting is a hinged connector 36 having a first longitudinal slot 38 hingedly connected to a second longitudinal slot 40, wherein the first longitudinal slot 38 is configured to operably seat the forward leading edge 22 of the respective end shade panel 20L, 20R and the second longitudinal slot 40 is configured to operably seat the respective end 14L, 14R of the front panel shade assembly 12.

As best illustrated by FIG. 7 and FIG. 8, the end shade panels 20L, 20R are generally configured to position the front shade panel assembly 12 at an angle with respect to the front roll bars 86L, 86R, which extend forward. Moreover, the end shade panels 20L, 20R further provide lateral shade or a barrier between the outside elements and the interior of the vehicle.

Figure 4:
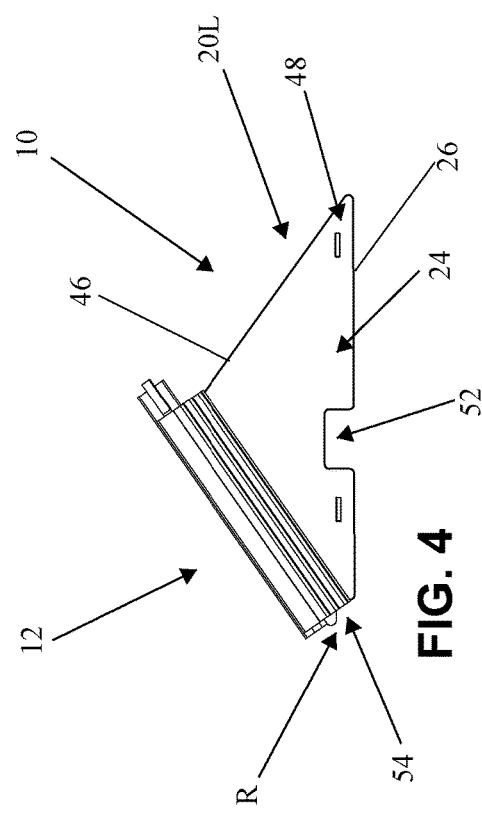
FIG. 4 is a left side elevation view of the version shown in FIG. 1.
Figure 5:
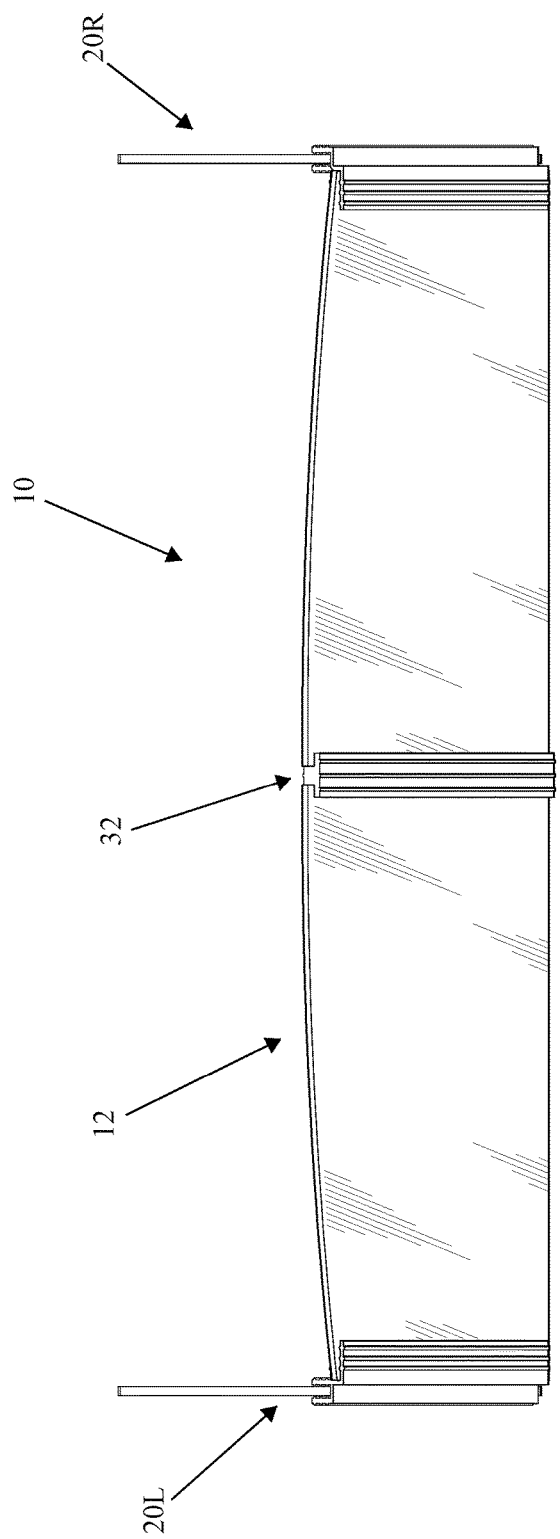
FIG. 5 is a top plan view of the version shown in FIG. 1.
Figure 6:
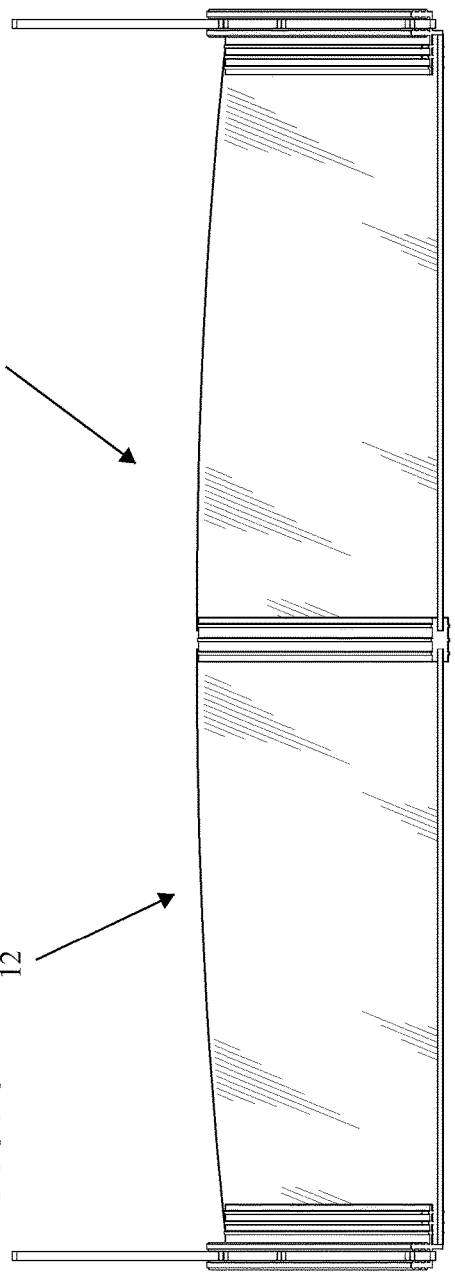
FIG. 6 is a bottom plan view of the version shown in FIG. 1.

In a detailed version, each end shade panel 20L, 20R is operably configured to position the front shade panel assembly 12 such that the angle formed between the plane formed by the exterior surface 44 of the front shade panel(s) 12 and the horizontal plane passing through the front roll bars 86L, 86R is between 30-50 degrees, ideally approximately 37 degrees—as best illustrated by FIG. 4 and FIG. 11. In essence, the front shade panel assembly 12 is tilted backward at an angle between 30-50 degrees relative to the horizon. Preferably, the angle formed is approximately 37 degrees.

The end shade panels 20L, 20R generally have an angled footprint in order to facilitate positioning the front shade panel assembly 12 at an angle. In the version, the footprint is generally in the shape of a triangle having a forward leading edge 22, rear aft edge 46, and a bottom portion 24 having a bottom edge 26.

In the version, each end shade panel 20L, 20R comprises one or more slots 48 for receiving the means for securing 13 each end shade panel 20L, 20R to the respective front roll bar 86L, 86R. In the version, the means for securing 13 is one or more attachment straps 50 having a length of material which is woven through each respective slot 48 then connected to the adjacent forward roll bar 86L, 86R by wrapping around thereto and attaching back on itself by way of a hook and loop type fastener, otherwise known as Velcro. See FIG. 10 and FIG. 11. Ideally, the means for securing is one or more straps 50 having a hook and loop type fastener in combination with the one or more slots 48; however, other means for securing 13 can certainly be envisioned such as by way of adhesives, straps with button snaps, clips, magnets or any device which secures the respective end shade panel 20L, 20R to the respective front roll bar 86L, 86R.

Moreover, in certain version of the application, the bottom portion 24 of each end shade panel 20L, 20R may include a shaped gap 52 for avoiding impeding structures near the respective front roll bar 86L, 86R and vehicle windshield assembly 88 for proper placement of windshield visor accessory 10. For example, as illustrated in FIG. 10 and FIG. 11, the bottom portion 24 comprises a shaped gap 52 in the shape of a rectangle in order to avoid a soft top mounting knob as frequently encountered on removable top vehicles.

Further, in the illustrated version, the forward leading edge 22 and the bottom edge 26 form a forward angle R, wherein the forward angle R comprises a second shaped gap 54 for operably sealing with the upper frame assembly 92 perimeter 94. In detail, as illustrated by FIG. 10, the second shaped gap 54 is an interior right-angle cutout which is configured to couple and seal with the rubber header channel of the upper frame assembly 92 of the windshield assembly 88 of the vehicle 80. Ideally, the forward angle R can range between 30-50 degrees, ideally 37 degrees.

Figure 13:
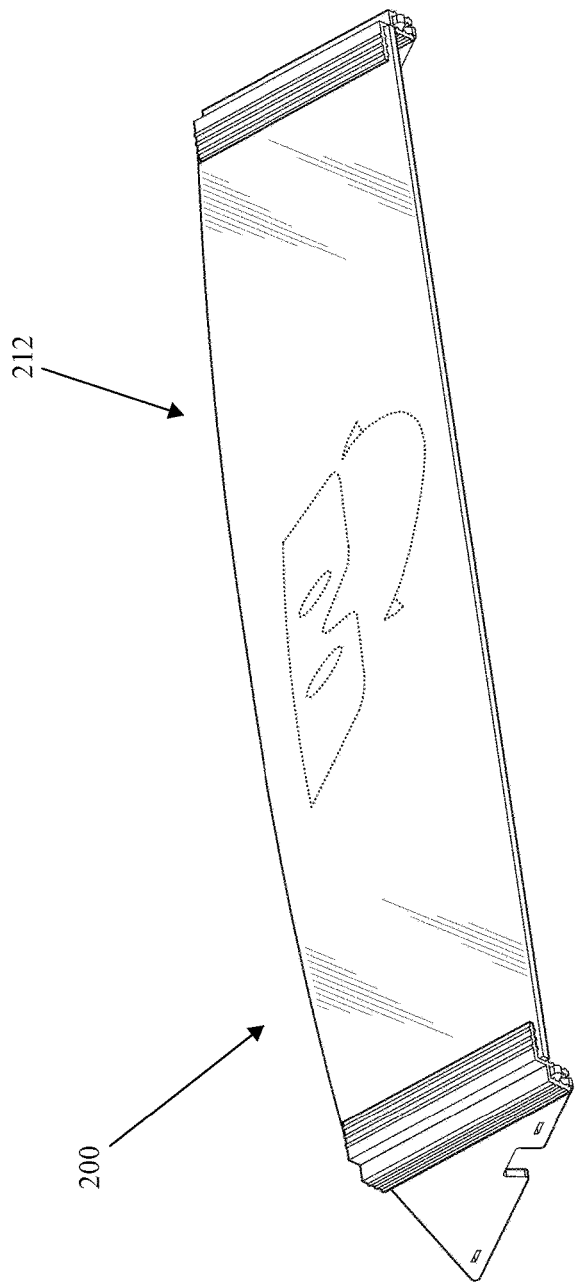
FIG. 13 is a front perspective view of a version boasting a decorative decal.
Figure 14:
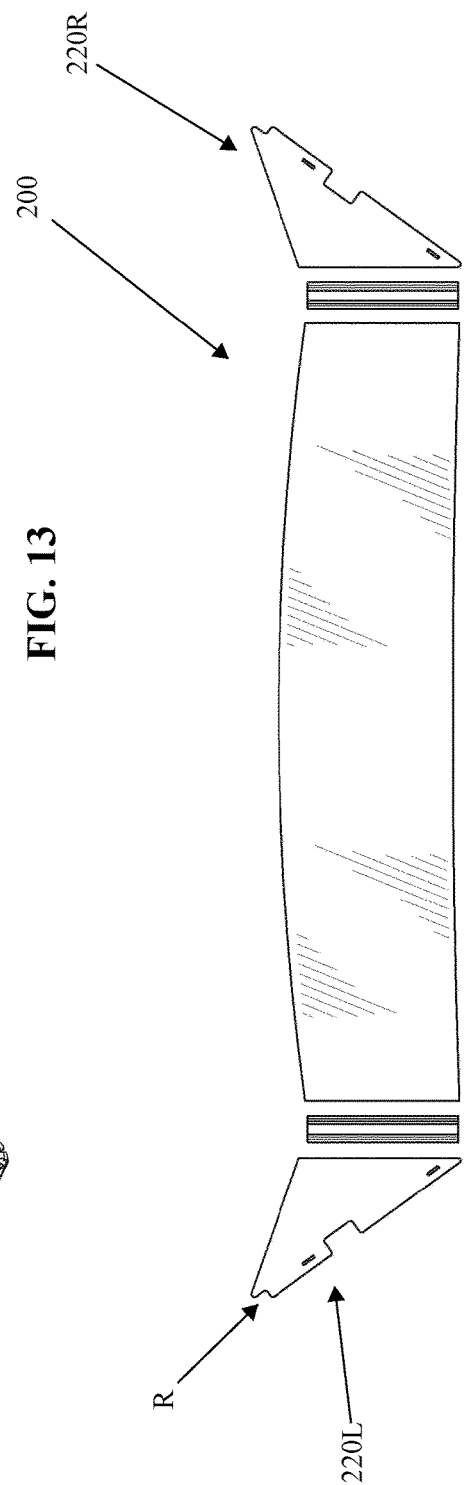
FIG. 14 is a disassembled plan view of a version of the application.

In a second version 200 as best illustrated by FIG. 12-FIG. 14, the front shade panel assembly 212 comprises a singular continuous front shade panel 214 extending between each of the end shade panels 220L, 220R. The front shade panel 214 comprises an upper perimeter 216 and a lower perimeter 218. In the version the upper perimeter 216 is upwardly curved in the form of an arc. Moreover, as specifically shown in FIG. 14, the lower perimeter 218 is slightly and gradually curved upward in the form of an arc—which assists in providing a compression type fit and seal with the upper frame 92 assembly of the vehicle 80. In a detailed version, the lower perimeter fits and couples with the rubber header channel as found commonly on open top vehicles. Further, the version comprises a general overall length and height, wherein the length is greater than the height.

Referring to FIG. 13, the surface 244 of the front shade panel(s) 212 can be decorated with the user's favorite logo such as a sports team or artwork as aesthetically desired. For example, a perforated window decal 260 can be applied to the exterior surface 244 of the front shade panel 212, which can display artwork or logo. Other artwork can be displayed by way of etched glass coupled with lighting.

The vehicle windshield visor accessory 10 can be made in any manner and of any material chosen with sound engineering judgment. Preferably, materials will be strong, lightweight, long lasting, economic, ergonomic, and buoyant.

The invention does not require that all the advantageous features and all the advantages need to be incorporated into every version of the invention.

Although preferred embodiments of the invention have been described in considerable detail, other versions and embodiments of the invention are certainly possible. Therefore, the present invention should not be limited to the described embodiments herein.

All features disclosed in this specification including any claims, abstract, and drawings may be replaced by alternative features serving the same, equivalent or similar purpose unless expressly stated otherwise.

What is claimed is:

1. An exterior windshield visor accessory operable with exposed top vehicles having a roll cage having front roll bars laterally extending forward and a windshield having an upper frame assembly, the visor accessory comprising:
   a front shade panel assembly having a first end, second end, an upper perimeter, and a lower perimeter;
   a first and second lateral end shade panels attachable to the respective first and second front shade panel ends and configured to couple with each respective front roll bar; and
   a means for securing each end shade panel to the respective front roll bar,
   wherein each end shade panel is operably configured to position the front shade panel such that the angle formed between the plane formed by the surface of the front shade panel and the horizontal plane of the front bars of the roll cage is between 30-50 degrees.

2. A visor accessory operable with exposed top vehicles having a roll cage having front roll bars laterally extending forward and a windshield having an upper exposed upper frame assembly, the visor accessory comprising:
   a) a front shade panel having a first end, second end, an upper perimeter, and a lower perimeter, the front shade panel comprising one or more laterally extending and aligned shade panels;
   b) a first and second lateral end shade panels, each end shade panel comprising:
      i) forward leading edge operably attachable to the respective first and second front shade panel ends; and
      ii) a lower portion adapted to couple with each respective front roll bar;
   c) a means for securing each end shade panel to the respective front roll bar; and
   d) a hinged connector operably connecting each end shade panel to the respective first and second end of the front shade panel.

3. The visor accessory of claim 2, wherein the hinged connector comprises a first longitudinal slot hingedly connected to a second longitudinal slot, wherein the first longitudinal slot is configured to operably seat the forward leading edge of the respective end shade panel and the second longitudinal slot is configured to operably seat the respective end of the front panel shade.

4. The visor accessory of claim 2, wherein near the bottom portion of each end shade panel comprises one or more slots for receiving the means for securing each end shade panel to the respective front roll bar.

5. The visor accessory of claim 2, wherein each shade end further comprises a bottom edge; wherein the forward leading edge and the bottom edge form a forward angle that is between 30-50 degrees.

6. The visor accessory of claim 2, wherein each end shade panel is operably configured to position the front shade panel such that the angle formed between the plane formed by the surface of the front shade panel and the horizontal plane of the front bars of the roll cage is between 30-50 degrees.

7. The visor accessory of claim 2, wherein near the bottom portion of each end shade panel comprises one or more slots for receiving the means for securing each end shade panel to the respective front roll bar.

8. An exterior windshield visor accessory operable with exposed top vehicles having a roll cage having front roll bars laterally extending forward and a windshield having an upper frame assembly, the visor accessory comprising:
- a front shade panel assembly having a first end, second end, an upper perimeter, and a lower perimeter;
- a first and second lateral end shade panels attachable to the respective first and second front shade panel ends and configured to couple with each respective front roll bar; and
- a means for securing each end shade panel to the respective front roll bar;
- wherein the first and second lateral end shade panels further comprise a forward leading edge operably attachable to the respective first and second front shade panel ends; and a bottom portion having a bottom edge adapted to couple with each respective front roll bar;
- wherein the forward leading edge and the bottom edge form a forward angle that is between 30-50 degrees.

* * * * *